(12) United States Patent
Takata et al.

(10) Patent No.: US 11,986,854 B2
(45) Date of Patent: May 21, 2024

(54) AUTOMOBILE PARTS

(71) Applicant: NIPPON PAINT AUTOMOTIVE COATINGS CO., LTD., Osaka (JP)

(72) Inventors: Shinya Takata, Osaka (JP); Yumiko Hayashi, Osaka (JP); Emi Toriyama, Saitama (JP); Ken Nakane, Saitama (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 322 days.

(21) Appl. No.: 17/278,925

(22) PCT Filed: Oct. 8, 2019

(86) PCT No.: PCT/JP2019/039595
§ 371 (c)(1),
(2) Date: Mar. 23, 2021

(87) PCT Pub. No.: WO2020/075697
PCT Pub. Date: Apr. 16, 2020

(65) Prior Publication Data
US 2021/0394228 A1    Dec. 23, 2021

(30) Foreign Application Priority Data

Oct. 9, 2018   (JP) ................................ 2018-190944

(51) Int. Cl.
| | | |
|---|---|---|
| *B05D 1/02* | (2006.01) | |
| *B05D 3/02* | (2006.01) | |
| *C09D 5/00* | (2006.01) | |
| *C09D 123/12* | (2006.01) | |
| *C09D 133/08* | (2006.01) | |

(52) U.S. Cl.
CPC ............. *B05D 1/02* (2013.01); *B05D 3/0272* (2013.01); *C09D 5/002* (2013.01); *C09D 123/12* (2013.01); *C09D 133/08* (2013.01); *B05D 2400/00* (2013.01); *B05D 2502/00* (2013.01); *B05D 2507/02* (2013.01)

(58) Field of Classification Search
CPC .... B05D 1/02; B05D 3/0272; B05D 2400/00; B05D 2502/00; B05D 2507/02; C09D 5/002; C09D 123/12; C09D 133/08
See application file for complete search history.

(56) References Cited

U.S. PATENT DOCUMENTS

| | | | | |
|---|---|---|---|---|
| 2003/0212191 A1* | 11/2003 | Nakaoka | .............. | C09D 151/06 524/507 |
| 2005/0009983 A1* | 1/2005 | Itakura | ............... | C08G 18/6283 524/589 |
| 2014/0187710 A1* | 7/2014 | Hayashi | ............... | C08L 33/064 524/547 |
| 2014/0227534 A1* | 8/2014 | Iwata | ............... | C08F 220/1811 428/423.1 |
| 2018/0258267 A1* | 9/2018 | Kim | ....................... | C08K 3/013 |

FOREIGN PATENT DOCUMENTS

| | | | |
|---|---|---|---|
| JP | H01131219 A | | 5/1989 |
| JP | H0411620 A | * | 1/1992 |
| JP | 2000204483 A | | 7/2000 |
| JP | 2003181368 A | | 7/2003 |
| JP | 2004131689 A | | 4/2004 |
| JP | 2007270014 A | | 10/2007 |

OTHER PUBLICATIONS

Machine Translation of Inomata et al. JP H0411620 A (Year: 1992).*

* cited by examiner

*Primary Examiner* — Callie E Shosho
*Assistant Examiner* — Bethany M Miller
(74) *Attorney, Agent, or Firm* — LADAS & PARRY LLP; Malcolm J. MacDonald, Esq.

(57) ABSTRACT

The object of the present disclosure is to provide an automobile part capable of improving fuel consumption by weight reduction of the part because the impact resistance that can be sufficiently used even in cold regions can be given to a part made of a thinner plastic.

An automobile part obtained by forming a coating film layer on a plastic material comprising a polypropylene resin composition modified with an elastomer component having a thickness of 1.5 to 2.5 mm, wherein said coating film layer is a multilayer coating film obtained by coating and baking the following coating compositions in this order;

(a) a primer coating composition having a single film tensile elongation of 5 to 35% at −20° C., (b) a base coating composition containing a coloring agent and, (c) a clear coating composition containing at least a linear acrylic polyol (c-1) with a hydroxyl value of 80 to 220 mgKOH/g, a crosslinked acrylic resin (c-2) containing 2 to 30 parts by weight of polyfunctional monomer (c-2-1) with 2 to 4 radically polymerizable unsaturated groups per a molecule and 98 to 70 parts by weight of monofunctional monomer (c-2-2) with one polymerizable unsaturated group as a constituent unit, and having a glass transition point of 70 to 120° C., and a curing agent (c-3), and wherein the coating film layer has a Dupont impact strength of 4.9 J or more at −30° C.

4 Claims, 1 Drawing Sheet

AUTOMOBILE PARTS

TECHNICAL FIELD

The present disclosure relates to automobile parts.

BACKGROUND OF THE DISCLOSURE

In recent years, improving the fuel efficiency of automobile is becoming more important from the viewpoint of energy saving and reduction of carbon dioxide emissions. From this point of view, the weight reduction of automobile parts continues to be promoted. The weight reduction of plastic parts used for automobiles (for example, bumpers, moldings, and so on) is also being studied, and thinning is being considered for the purpose of weight reduction.

The strength of the plastic product has a close relationship with the thickness thereof, and when the plastic product is made thinner, the strength thereof deteriorates. In addition, automobiles need to be applied in a variety of operating environments. Extremely harsh environments are envisioned in these operating environments and must be adaptable. As an example, the use in a cold region of −30° C. or less can be mentioned. However, the thinned plastic automobile parts have a problem that sufficient impact resistance cannot be obtained at a low temperature of −30° C.

In the case of plastic automobile parts, coating is usually performed. Therefore, an attempt has been made to improve such a problem by forming a coating film having various physical properties such as impact resistance.

Patent Document 1 discloses resin particles for coating compositions having Young's modulus, elongation and breaking strength within specific ranges, and describes that a coating film having excellent chipping resistance is formed by using a coating composition containing the resin particles. However, this is not an invention concerning the composition of the resin used in the coating. No attempt has been made to improve the impact resistance at low temperatures.

Patent Document 2 discloses a method for forming a multilayer coating film using a coating composition having specific physical properties in Young's modulus and destruction energy as a first base coating composition. However, no attempt has been made to improve impact resistance at low temperature.

Patent Document 3 discloses a coating method for coating a primer on a metal plate, an intermediate coating composition, and a top coating composition. However, no attempt has been made to improve impact resistance at low temperatures, and no mention has been made of the coating of plastic products.

On the other hand, the use of a polymer obtained by partially using a polyfunctional monomer in an acrylic resin used in the coating field has hardly been studied. As such, for example, such resin compositions are disclosed in Patent Document 4 and 5. However, there is no mention of their use as coating compositions for automobile parts.

PRIOR TECHNICAL DOCUMENT

Patent Document

[Patent Document 1] JP-A-2007-270014
[Patent Document 2] JP-A-2003-181368
[Patent Document 3] JP-A-2000-204483
[Patent Document 4] JP-A-2004-131689
[Patent Document 5] JP-A-H01-131219

SUMMARY OF INVENTION

Problem to be Solved by the Invention

The present disclosure solves the above problems and provides an automobile part capable of improving fuel consumption by weight reduction of the part because the impact resistance that can be sufficiently used even in cold regions can be given to a part made of a thinner plastic.

Means for Solving Object

The present disclosure relates to an automobile part obtained by forming a coating film layer on a plastic material comprising a polypropylene resin composition modified with an elastomer component having a thickness of 1.5 to 2.5 mm, wherein said coating film layer is a multilayer coating film obtained by coating and baking the following coating compositions in this order;

(a) a primer coating composition having a single film tensile elongation of 5 to 35% at −20° C., (b) a base coating composition containing a coloring agent and, (c) a clear coating composition containing at least a linear acrylic polyol (c-1) with a hydroxyl value of 80 to 220 mgKOH/g, a crosslinked acrylic resin (c-2) containing 2 to 30 parts by weight of polyfunctional monomer (c-2-1) with 2 to 4 radically polymerizable unsaturated groups per a molecule and 98 to 70 parts by weight of monofunctional monomer (c-2-2) with one polymerizable unsaturated group as a constituent unit, and having a glass transition point of 70 to 120° C., and a curing agent (c-3), and wherein the coating film layer has a Dupont impact strength of 4.9 J or more at −30° C.

The base coating composition is preferably solvent type one component, solvent type two component, or aqueous one component.

The crosslinked acrylic resin (c-2) preferably has a weight average molecular weight of 15000 to 200000.

In the automobile part, a weight ratio of the linear acrylic polyol (c-1) to the crosslinked acrylic resin (c-2) is preferably (c-1)/(c-2)=90/10 to 50/50.

Effect of the Invention

Since the automobile part of the present disclosure has excellent impact resistance due to the excellent performance of the coating film, the automobile part has impact resistance even at low temperatures in spite of being thin. This reduces the weight of automobile parts and improves the fuel efficiency of automobiles. It also has excellent gasohol resistance.

DETAILED DESCRIPTION OF PREFERRED EMBODIMENTS

In the following, the present disclosure is described in detail.

(Plastic Material)

The automobile part is obtained by forming a coating film layer on a plastic material comprising a polypropylene resin composition modified with an elastomer material and having a thickness of 1.5 to 2.5 mm. That is, a coating film is formed so as to impart sufficient low-temperature impact resistance even to a thin article having a thickness of 1.5 to 2.5 mm.

The plastic material of the present disclosure comprises a polypropylene resin composition modified with an elastomer material. The polypropylene resin modified with the elastomer material is not particularly limited, and a publicly known commercially available one can be used. Further, additives other than the resin may be added as necessary.

In the present disclosure, a coating film is formed on the plastic material having a thickness of 1.5 to 2.5 mm. Examples of such plastic materials include automobile parts such as automobile bumpers and moles. The thickness means that the thinnest part of the plastic parts is within the above range.

(Coating Film Layer)

The coating film layer formed in the automobile part of the present disclosure is a multilayer coating film obtained by coating and baking a primer coating composition, a base coating composition containing a coloring agent and a clear coating in this order. In particular, in the clear coating film, a crosslinked acrylic resin (c-2) containing 2 to 30 parts by weight of polyfunctional monomer (c-2-1) with 2 to 4 radically polymerizable unsaturated groups per a molecule and 98 to 70 parts by weight of monofunctional monomer with one polymerizable unsaturated group as a constituent unit, and having a glass transition point of 70 to 120° C. is used.

The polymer obtained by copolymerizing a polyfunctional monomer having 2 to 4 radically polymerizable unsaturated groups is a resin which has not been studied in the coating field. The present inventors have studied a coating composition containing such a resin and found that the coating composition has an impact resistance superior to that of a conventional coating composition. In particular, impact resistance is improved by using a polyfunctional monomer (c-2-1) having 2 to 4 radically polymerizable unsaturated groups per molecule and using a resin having a Tg of 70 to 120° C. In the primer coating composition, a flexible resin having a tensile elongation of 5 to 35% at −20° C. absorbs impact energy and hardly causes peeling at the interface between the base material and the coating film at the time of impact, so that the above object may be achieved.

The polymer obtained by using a polyfunctional monomer (c-2-1) having 2 to 4 radically polymerizable unsaturated groups has a crosslinked structure, so that a coating film having good impact resistance can be easily formed. Generally, when a resin having a high glass transition point is used, the reaction hardly proceeds during thermosetting. However, since the polymer obtained by using a polyfunctional monomer (c-2-1) having 2 to 4 radically polymerizable unsaturated groups has a crosslinked structure in the state of the polymer, sufficient impact strength can be obtained.

(Primer Coating Composition)

The primer coating composition of the present disclosure has a tensile elongation of 5 to 35% at −20° C. of a single film. Here, the tensile elongation is a value measured by the following method.

<Measuring Method of Tensile Elongation>

(i) A coating film is formed by coating a coating plate on which a coating film can be peeled so as to have a dry film thickness of 30 μm and drying the coated plate at 80° C. for 25 minutes.
(ii) A test piece is prepared in a size of 10 mm in length and 50 mm in width, a masking tape is stuck to both ends, and the remaining half of the masking tape is folded back.
(iii) The tensile elongation is measured by Shimazu Autograph (AG-IS) at −20° C. and a tensile speed of 5 mm/min.
(iv) 5 samples are measured and the average value is calculated.

The primer is not particularly limited as long as it satisfies the tensile elongation described above, but a conductive primer capable of imparting conductivity to a plastic material is preferable. Among them, aqueous conductive primers are preferable, and for example, a primer containing a resin for primer, a conductive agent (Carbon black, antimony-doped tin oxide treated titanium oxide, etc.), a white pigment, and other raw materials as necessary may be used.

The blending ratio of water in the aqueous conductive primer is preferably 45 to 90% by mass, more preferably 50 to 80% by mass based on the whole conductive primer. When the blending ratio of the water is less than 45% by mass, the viscosity is increased, and storage stability and coating workability are lowered. On the other hand, when the blending ratio of the water exceeds 90% by mass, the ratio of the non-volatile amount is lowered, the coating efficiency is deteriorated, and appearance abnormality such as foaming and sagging is liable to occur. The aqueous conductive primer may further contain an organic solvent, and the blending ratio thereof is usually not more than 40% by mass based on the contained water.

As the resin components for the primer of the aqueous conductive primer, it is preferable to use a pigment dispersion resin such as an acid-modified polypropylene, an acid-modified chlorinated polyolefin, an epoxy resin, a polyurethane resin; an aqueous alkyd resin and a water-soluble acrylic resin. It may contain all of these.

The primer can be applied by a method such as spray coating or bell coating. The base material may be washed and degreased as necessary.

The primer coating film preferably has a dry film thickness of 5 to 30 μm. When the thickness is less than 5 μm, the concealability is insufficient, and when the thickness is more than 30 μm, the foaming and sagging are likely to be generated. Preferably 10 to 20 μm. The dry film thickness can be measured using an SDM-miniR manufactured by SANKO.

In the present disclosure, the coating film elongation of the primer coating composition can be adjusted to a predetermined range by adjusting the composition of the coating composition and adjusting the composition of the resin to be used by a method well known to those skilled in the art. The coating composition can also be adjusted by using a softner such as an alkyd resin for coating, a polyester resin for coating, polytetramethylene glycol, polypropylene glycol, polyethylene glycol or a mixture thereof.

(Base Coating Composition)

In the present disclosure, a base coating composition containing a coloring agent is used. The base coating composition is not particularly limited, and any known base coating composition can be used. Any known inorganic pigment, organic pigment or the like can be used as the coloring agent. The blending amount thereof is not particularly limited. The coating composition may be aqueous or solvent type. The base layer may be composed of two layers of a colored base layer and a mica base layer. The thickness of the base coating film is preferably 10 to 30 µm. When the thickness is less than 10 µm, there is a possibility that the concealability is insufficient, and when the thickness is more than 30 µm, there is a possibility that defects such as sagging and foaming occur. The thickness is preferably 15 to 20 µm. The dry film thickness can be measured using an SDM-miniR manufactured by SANKO.

The base coating composition is preferably solvent type one component, solvent type two component, or aqueous one component. Any of these forms can be suitably used for the purpose of the present disclosure.

(Clear Coating Composition)

In the present disclosure, as a clear coating composition, a clear coating composition containing at least a linear acrylic polyol (c-1) with a hydroxyl value of 80 to 220 mgKOH/g, a crosslinked acrylic resin (c-2) containing 2 to 30 parts by weight of polyfunctional monomer (c-2-1) with 2 to 4 radically polymerizable unsaturated groups per a molecule and 98 to 70 parts by weight of monofunctional (meth)acrylic monomer (c-2-2) as a constituent unit, and having a glass transition point of 70 to 120° C., and a curing agent (c-3) is used.

(Linear Acrylic Polyol (c-1))

The linear acrylic polyol (c-1) is not particularly limited, and a usual linear acrylic polyol used in the coating field can be used. The linear acrylic polyol (c-1) needs to have a hydroxyl value of 80 to 220 mgKOH/g. When the hydroxyl value is less than 80 mgKOH/g, the crosslinking density of the clear coating film decreases, thereby causing a problem that the solvent resistance, weather resistance, and the like are insufficient, and when the hydroxyl value exceeds 220 mgKOH/g, a problem that the hydroxyl group remains and water resistance and moisture resistance decrease occurs. The lower limit is more preferably 95 mgKOH/g, and still more preferably 110 mgKOH/g. The upper limit is more preferably 200 mgKOH/g, and still more preferably 180 mgKOH/g.

The monomer that can be used as the monomer constituting the linear acrylic polyol (c-1) is not particularly limited, and monofunctional (meth)acrylates, vinyl monomers, amide monomers, and the like can be cited.

Examples of monofunctional (meth)acrylates are methyl (meth)acrylate, ethyl (meth)acrylate, propyl (meth)acrylate, isopropyl (meth)acrylate, n-butyl (meth)acrylate, isobutyl (meth acrylate, t-butyl (meth)acrylate, hexyl (meth)acrylate, 2-ethylhexyl (meth)acrylate, lauryl (meth)acrylate, stearyl (meth)acrylate, cyclohexyl (meth)acrylate, benzyl (meth) acrylate, isobornyl (meth)acrylate, polyethylene glycol mono (meth)acrylate, polypropylene glycol mono (meth) acrylate, methoxyethylene glycol (meth)acrylate, methoxyethyl (meth)acrylate, ethoxyethyl (meth)acrylate, methoxypolyethylene glycol (meth)acrylate, methoxypolypropylene glycol (meth)acrylate, 2-hydroxyethyl (meth)acrylate, 2-hydroxypropyl (meth)acrylate, 2-hydroxybutyl (meth)acrylate, hydroxyethyl-γ-(meth)acrylate, glycidyl (meth)acrylate, methylglycidyl (meth)acrylate, dimethylaminoethyl (meth) acrylate, diethylaminoethyl (meth)acrylate, and modified products thereof (derivative) [for example, ethylene oxides, propylene oxides, and γ-butyrolactone or ε-caprolactone adducts of hydroxyl group-containing (meth)acrylates such as 2-hydroxyethyl acrylate, 2-hydroxypropyl (meth)acrylate and 2-hydroxybutyl (meth) acrylate], trifluoroethyl (meth) acrylate, polydimethylsiloxane macromer, γ-(meth) cryloxypropyltrimethoxy silane and the like.

Examples of vinyl monomers include vinyl aromatic compounds such as styrene, vinyl toluene, p-methyl styrene, α-methyl styrene, p-tert-butyl styrene, and vinyl pyridine, and other vinyl monomers such as N-vinyl pyrrolidone, vinyl chloride, vinyl acetate, hydroxybutyl vinyl ether, lauryl vinyl ether, cetyl vinyl ether, 2-ethylhexyl vinyl ether, and modified products thereof (derivative).

Examples of amide monomers include (meth)acrylamide, diacetone (meth)acrylamide, isobutoxymethyl (meth)acrylamide, N, N-dimethyl (meth)acrylamide, N, N-diethyl (meth)acrylamide, N-isopropyl (meth)acrylamide, tert-octyl (meth)acrylamide, N, N-dimethylaminopropyl (meth)acrylamide, and modified products thereof (derivative). Examples of the maleimide derivative include N-phenylmaleimide, N-cyclohexylmaleimide, N-butylmaleimide, and the like.

The linear acrylic polyol (c-1) does not use a monomer having 2 or more unsaturated functional groups in principle, but may contain a monomer having 2 or more unsaturated functional groups in a small amount without affecting physical properties. The amount of the monomer having 2 or more unsaturated functional groups is preferably 1.0% by weight or less.

The linear acrylic polyol (c-1) preferably has a weight average molecular weight in the range of 3500 to 10000. If the weight average molecular weight is less than 3500, there may be a problem that the solvent resistance, weather resistance, appearance and the like are not sufficient, and if the weight average molecular weight is more than 10,000, there may be a problem that the coating workability and appearance are deteriorated due to the high viscosity. The lower limit is more preferably 4000, and still more preferably 4500. The upper limit is more preferably 8000, and still more preferably 6000.

The weight average molecular weight in the present specification is a value measured by gel permeation chromatography using HLC-8200 manufactured by Tosoh Corporation. The measurement conditions are as follows. Columns: TS gel Super Multipore HZ-M, three columns
Developing solvent: tetrahydrofuran
Column inlet oven: 40° C.
Flow: 0.35 ml
Detector: RI
Standard Polystyrene: PS Oligomer Kit manufactured by Tosoh Corporation The linear acrylic polyol (c-1) preferably has a glass transition temperature of −10 to 80° C. When the glass transition temperature is less than −10° C., there is a possibility that the contamination resistance and scratch resistance of the coating film are insufficient, and when the glass transition temperature is more than 80° C., there is a possibility that the bending resistance is insufficient. The lower limit is more preferably 20° C., more preferably 40° C. The upper limit is more preferably 70° C., more preferably 65° C.

Figure 1:
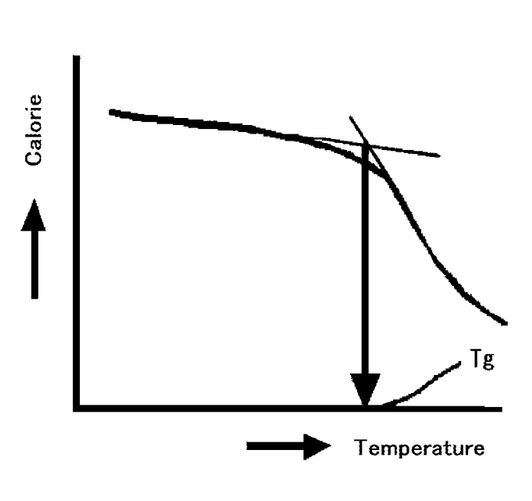
FIG. 1 is a diagram showing a method of reading a measurement value from a chart in the measurement of a glass transition point according to the present disclosure

The glass transition temperature used herein was measured by a differential scanning calorimeter (DSC) (Thermal analyser SSC 5200 (SEIKO ELECTRONICS)) in accordance with the following process. That is, in the step of raising the temperature at the temperature rising speed of 10° C./min from 20° C. to 150° C. (Step 1), the step of lowering the temperature at the temperature falling speed of 10° C./min from 150° C. to −50° C. (Step 2), and the step of raising the temperature at the temperature rising speed of 10° C./min from −50° C. to 150° C. (Step 3), the value is obtained from the temperature rising chart of Step 3. That is, the temperature indicated by the arrow in the chart shown in FIG. 1 is referred to as Tg.

The linear acrylic polyol (c-1) can be obtained by any known method such as solution polymerization in an organic solvent or emulsion polymerization in an aqueous dispersion.

(Crosslinked Acrylic Resin (c-2))

The crosslinked acrylic resin (c-2) crosslinked acrylic resin (c-2) containing 2 to 30 parts by weight of polyfunctional monomer (c-2-1) with 2 to 4 radically polymerizable unsaturated groups per a molecule and 98 to 70 parts by weight of monofunctional (meth)acrylic monomer (c-2-2) as a constituent unit. The crosslinked acrylic resin (c-2) is dissolved in a solvent or finely dispersed in a state of nanoparticles. Therefore, since the resin solution has transparency, the transparency of the clear coating film is not affected. In this respect, they are clearly different from internal crosslinked particles having a large particle diameter used in the coating field.

The polyfunctional monomer (c-2-1) with 2 to 4 radically polymerizable unsaturated groups per molecule is preferably a (meth)acrylate with 2 to 4 functional groups.

Examples of (meth)acrylates with 2 functional groups include 1,4-butanediol di(meth)acrylate, 1,3-butanediol di(meth)acrylate, 1,6-hexanediol di(meth)acrylate, ethylene glycol di(meth)acrylate, diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, neopentyl glycol di(meth)acrylate, hydroxypivalic acid-based neopentylglycol di(meth)acrylate, 1,6-hexanediol di(meth)acrylate, 1,9-nonanediol di(meth)acrylate, 1, 10 decanediol di(meth)acrylate, glycerin di(meth)acrylate, dimethylol tricyclodecane di(meth) acrylate and the like. Among them, ethylene glycol dimethacrylate, diethylene glycol dimethacrylate or the like can be preferably used.

Examples of (meth)acrylates with 3 functional groups include trimethylolmethane tri(meth)acrylate, trimethylolpropane tri(meth)acrylate, trimethylolpropane ethylene oxide-modified tri(meth)acrylate, trimethylolpropane propylene oxide-modified tri(meth)acrylate, pentaerythritol tri (meth)acrylate, glycerin propoxytri(meth)acrylate, tris(2-(meth)acryloyloxyethyl) isocyanurate and the like. Among them, trimethylolpropane trimethacrylate, pentaerythritol trimethacrylate and the like are preferably used.

Examples of (meth)acrylates with 4 functional groups include dipentaerythritol tetra(meth)acrylate, pentaerythritol tetra(meth)acrylate, pentaerythritol ethylene oxide-modified tetra(meth)acrylate, pentaerythritol propylene oxide-modified tetra(meth)acrylate, ditrimethylolpropane tetra(meth) acrylate and the like. Among them, ditrimethylolpropane tetra(meth)acrylate, pentaerythritol tetra(meth)acrylate or the like can be preferably used. Only one kind of polyfunctional monomer may be used, or two or more kinds of polyfunctional monomers may be used in combination.

A monofunctional monomer (c-2-2) with one polymerizable unsaturated group is a monomer having only 1 unsaturated bond. As such, various monomers such as monofunctional (meth)acrylates, vinyl monomers, and amide monomers exemplified as those which can be used as raw material monomers of the aforementioned linear acrylic polyols (c-1) can be used.

In the crosslinked acrylic resin (c-2), the glass transition temperature is 70 to 120° C. Within the range, it becomes brittle in a low temperature environment and thereby can prevent the destruction of the material by destroying only the coating film to disperse the impact energy at the time of impact. The measurement of the glass transition temperature can be performed by the same method as the measurement method in the linear acrylic polyol (c-1) described above.

In the (c-2), 2 to 30 parts by weight of polyfunctional monomer (c-2-1) and 98 to 70 parts by weight of monofunctional (meth)acrylic monomer (c-2-2) are used.

When the polyfunctional monomer (c-2-1) is less than 2 parts by weight, sufficient low temperature impact resistance cannot be obtained. When the content exceeds 30 parts by weight, gelation occurs at the time of polymerization, making it difficult to obtain a resin.

When a hydroxyl group-containing (meth)acrylate is used as the monofunctional (meth)acrylate (c-2-2), it is preferable to blend it so that the hydroxyl value of the resulting resin is 0 to 50 mgKOH/g. When it is used as a resin for coating, the curing reaction can be suitably carried out by setting the value within the range.

When a (meth)acrylic acid is used as the (c-2-3), it is preferable to blend it so that the acid value of the resulting resin is 0 to 10 mgKOH/g. When it is used as a resin for coating, the curing reaction can be suitably carried out by setting the value within the range.

The crosslinked acrylic resin (c-2) preferably has a weight average molecular weight of 15000 to 200000. This is preferable in that sufficient low temperature impact resistance can be obtained by setting it within the range. The lower limit is more preferably 17000, and still more preferably 20000. The upper limit is more preferably 100000, and still more preferably 50000. The measurement of the weight-average molecular weight can be performed by the same method as that for the linear acrylic polyol (c-1) described above.

(Method for Producing Crosslinked Acrylic Resin (c-2))

The method for producing the crosslinked acrylic resin (c-2) is not particularly limited, but it is preferable to carry out radical polymerization in an organic solvent in the presence of a radical polymerization initiator at a predetermined temperature range. Specifically, although not particularly limited, a method of adding a mixture comprising a monomer composition, a radical polymerization initiator and an optionally added organic solvent to a reaction vessel adjusted to a predetermined temperature range can be suitably employed.

As the radical polymerization initiator, in addition to tert-amyl peroxypivalate and AIBN, generally used radical polymerization initiators can be used, for example, tert-butyl peroxyacetate, tert-butyl peroxyisobutyrate, tert-butyl peroxypivalate, tert-butyl peroxyoctoate, tert-butyl peroxy-2 ethyl hexanoate, tert-butyl peroxy neodecanoate, tert-amyl peroxyneodecanoate, tert-amyl peroxyoctoate, tert-amylperoxy-2 ethyl hexanoate, tert-amyl peroxyneodecanoate, tert-butyl peroxybenzoate, benzoyl peroxide, lauroyl peroxide, isobutyrylperoxide, succinic peroxide, di-tert-butyl peroxide, isobutyl peroxide, 2,2'-azobis-2,4-dimethylvaleronitrile, 2,2'-azobis-(4-methoxy-2,4-dimethylvaleronitrile), 2,2'-azobis-2-methylbutyronitrile and the like. Only one kind of radical polymerization initiator may be used, or two or more kinds of radical polymerization initiators may be used in combination.

The amount of the radical polymerization initiator to be used is usually about 0.5 to 10 parts by weight, preferably 1 to 8 parts by weight relative to the monomer composition 100 parts by weight to be used.

Examples of the organic solvent include hydrocarbons such as toluene, xylene, ethylbenzene, cyclopentane, octane, heptane, cyclohexane, and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether, propylene glycol monomethyl ether; Esters such as propyl acetate, butyl acetate, isobutyl acetate, benzyl acetate, ethylene glycol monomethyl ether acetate, ethylene glycol monoethyl ether acetate, propylene glycol monomethyl ether acetate, propylene glycol monoethyl ether acetate, and the like; Ketones such as methyl ethyl ketone, ethyl isobutyl ketone and methyl isobutyl ketone; alcohols such as n-butanol and propyl alcohol. Only one kind of organic solvent may be used, or two or more kinds of organic solvents may be used in combination.

Among them, the organic solvent is preferably a solvent capable of dissolving the monomer composition, more preferably a solvent capable of dissolving both the monomer composition and the crosslinked polymer (A) to be produced, that is, a solvent capable of solution polymerization. Butyl acetate, propylene glycol monomethyl ether, propylene glycol monomethyl ether acetate, methyl isobutyl ketone and the like are preferably used as such organic solvent. The amount of the organic solvent used relative to the amount of the monomer composition used is preferably an amount capable of dissolving at least the entire amount or substantially the entire amount of the monomer composition, and more preferably an amount capable of dissolving the entire amount or substantially the entire amount of the monomer composition and the crosslinked polymer (A) to be produced. The weight ratio of the monomer to the organic solvent is preferably 5/95 to 65/35. If the monomer fraction is less than 5/95, productivity is poor; if the monomer fraction is greater than 65/35, gelation is likely to occur. The weight ratio is more preferably from 10/90 to 60/40, and more preferably from 15/85 to 55/45.

(Mixture Ratio of Linear Acrylic Polyol (c-1) and Crosslinked Acrylic Resin (c-2))

In the clear coating composition used in the present disclosure, the mixing ratio of the linear acrylic polyol (c-1) and the crosslinked acrylic resin (c-2) is preferably (c-1)/(c-2)=90/10 to 50/50. When the linear acrylic polyol (c-1) is blended beyond the above range, it is not preferable in that sufficient low temperature impact resistance cannot be obtained. When the crosslinked acrylic resin (c-2) is blended beyond the above range, it is not preferable in view of insufficient flexibility resistance.

(Curing Agent (c-3))

The curing agent (c-3) is not particularly limited, and a compound having two or more functional groups causing a reaction with a hydroxyl group, a carboxyl group or the like can be used. Such compounds include, for example, polyisocyanates, and amino resins such as melamine resins.

The polyisocyanate is not particularly limited as long as it is a compound having two or more isocyanate groups, for example, aromatic isocyanates such as tolylene diisocyanate, 4,4'-diphenylmethane diisocyanate, xylylene diisocyanate, and meta-xylylene diisocyanate; aliphatic isocyanates such as hexamethylene diisocyanate; alicyclic isocyanates such as isophorone diisocyanate; monomers thereof and multimers such as a burette type, a nurate type, and an adduct type are included.

Commercial products of the polyisocyanate include Duranate 24A-90PX (NCO: 23.6%, trade name, manufactured by Asahi Kasei), Sumidur N-3200-90 M (Product name: Sumika Bayer Urethane Co., Ltd.), Takenate D165N-90X (Product name: manufactured by Mitsui Takeda Chemical Company, Limited), Sumidur N-3300, Sumidur N-3500 (All products are manufactured by Sumika Bayer Urethane Co., Ltd.), Duranate THA-100 (Product name, manufactured by Asahi Kasei) and the like. If necessary, blocked isocyanates may be used.

In the coating composition, the equivalent ratio of the NCO groups in the curing agent (c-3) and the sum of the OH groups in the linear acrylic polyol (c-1) and the crosslinked acrylic resin (c-2) (NCO/OH) is preferably 0.8/1 to 1.2/1. When the ratio is less than 0.8/1, there is a possibility that the coating film strength of the clear coating film becomes insufficient. When the ratio exceeds 1.2/1, the weather resistance and hardness may become insufficient. The equivalent ratio (NCO/OH) is more preferably 0.9/1 to 1.1/1.

The amino resin is a condensate obtained by modifying a lower alcohol such as methanol, ethanol, propanol or butanol to a condensate of an amino compound such as melamine, urea or benzoguanamine and an aldehyde compound such as formaldehyde or acetaldehyde.

The amino resin preferably has a molecular weight of 500 to 2000. Examples of these include melamine resins sold under the trademark Cymel 235, 238, 285, 232 (Manufactured by Mitsui Cytec Corporation).

The blending amount of the amino resin is preferably within the range of the lower limit of 15 parts by mass and the upper limit of 35 parts by mass per 100 parts by mass of the resin solid content of the coating composition.

(Other Additives)

In the clear coating material, in addition to the components described above, additives generally formulated in the coating field may be formulated. For example, a base color pigment or a metallic pigment can be contained within a range that does not inhibit transparency. Further, an ultraviolet absorber, a hindered amine light stabilizer, an antioxidant, crosslinked resin particles, a surface modifier or the like can be blended.

(Two Component Solvent Type Clear Coating Composition)

The clear coating composition used in the present disclosure is not particularly limited in form, but preferably a two component curable clear coating composition comprising a main agent solution containing the linear acrylic polyol (c-1) and the crosslinked acrylic resin (c-2) and the curing agent solution containing the curing agent (c-3).

The thickness of the clear coating film is preferably 15 to 50 μm. When the thickness is less than 15 μm, the problem that the unevenness of the base cannot be concealed may occur, and when the thickness is more than 50 μm, the problem that defects such as foaming and sagging occur during coating may occur. Preferably, the thickness is 20 to 45 μm. The dry film thickness can be measured using an SDM-miniR manufactured by SANKO.

(Coating Method for Multilayer Coating Film)

The automobile part of the present disclosure has a multilayer coating film having the primer layer, the base layer, and the clear layer, but the method of forming the coating film is not particularly limited, and the coating film can be formed by a conventional coating method used in coating automobile plastic parts such as bumpers.

In the method for forming a multilayer coating film of the present disclosure, a primer, a color base coating composition and a clear coating composition may be applied to the surface of a substrate in this order to form a multilayer uncured film and perform a baking step.

The baking temperature in this case is preferably, for example, 80 to 120° C. in view of the balance between quick curing and prevention of deformation of the plastic molded article. Preferably, the temperature is 90 to 110° C. The baking time is usually 10 to 60 minutes, preferably 15 to 50 minutes, more preferably 20 to 40 minutes. When the baking time is less than 10 minutes, the curing of the coating film is insufficient, and the performance of the cured coating film such as water resistance and solvent resistance is deteriorated. On the other hand, if the baking time is longer than 60 minutes, the adhesion in the recoat or the like is reduced due to overcuring, and the total time of the coating process becomes longer, resulting in an increase in energy cost. It should be noted that the baking time refers to a period of time during which the substrate surface actually continues to maintain the target baking temperature, and more specifically refers to a period of time during which the substrate surface continues to maintain the temperature after reaching the target baking temperature, without considering a period of time until the substrate surface reaches the target baking temperature.

For example, a drying furnace using a heating source such as hot air, electricity, gas, or infrared rays can be used as a heating device for simultaneously baking an uncured film of a coating composition, and it is preferable to use a drying furnace using two or more heating sources in combination to shorten the drying time.

The multilayer coating film in the automobile part of the present disclosure has a Dupont impact strength at −30° C. of 4.9 J. Thus, in cold regions such as Europe and China, damage to the bumper can be prevented even when the bumper collides with the snow bank.

The DuPont impact strength at −30° C. was measured by the method detailed in the following examples.

EXAMPLES

Hereinafter, the present disclosure will be described in more detail by way of examples, but the invention is not limited only to the examples. In the examples, "%" means "% by weight", unless otherwise specified.

Manufacturing Example 1

Production of Polypropylene Emulsion

Production Example 1-1 Production of Polyolefin

In a 1000 ml round-bottom flask, 110 ml of desalinated water, 22.2 g of magnesium sulfate 7 hydrate and 18.2 g of sulfuric acid were collected and dissolved under stirring. 16.7 g of a commercially available granulated montmorillonite was dispersed in this solution, and the mixture was heated to 100° C. and stirred for 2 hours. Thereafter, the slurry was cooled to room temperature and filtered to collect the wet cake. The collected cake was again slurried in a 1000 ml round-bottom flask with 500 ml of desalinated water and filtered. This operation was repeated twice. The resulting cake was dried overnight at 110° C. in a nitrogen atmosphere to give 13.3 g of chemically treated montmorillonite.

To 4.4 g of chemically treated montmorillonite obtained, 20 ml of a toluene solution of triethylaluminum (0.4 mmol/ml) was added and the mixture was stirred at room temperature for 1 hour. To this suspension was added 80 ml of toluene, and after stirring, the supernatant was removed. After repeating this procedure 2 times, toluene was added to obtain a clay slurry (Slurry concentration=99 mg clay/ml).

To another flask, 0.2 mmol of triisobutylaluminum was collected, 19 ml of the clay slurry obtained here and a toluene diluent of dichloro[dimethylsilylene(cyclopentadienyl) (2,4-dimethyl-4H-5,6,7,8-tetrahydro-1-azulenyl)] hafnium 131 mg (57 µmol) were added, and the mixture was stirred at room temperature for 10 minutes to obtain a catalyst slurry.

Then, 11 L of toluene, 3.5 mmol of triisobutyl aluminum and 2.64 L of liquid propylene were introduced into a 24 liter induction stirring type autoclave. The total amount of the catalyst slurry was introduced at room temperature, and the temperature was raised to 67° C., and stirring was continued at the same temperature for 2 hours while the total pressure and hydrogen concentration during polymerization were kept constant at 0.65 MPa and 400 ppm, respectively. After the stirring was completed, the unreacted propylene was purged to stop the polymerization. The autoclave was opened to recover the total amount of the toluene solution of the polymer, and the solvent and clay residue were removed to obtain 10.9% by mass polypropylene toluene solution of 11 kg (1.20 kg Polypropylene). The weight average molecular weight Mw of the resulting polypropylene was 300,000 (Pst conversion value), and the crystallinity of the PP portion was 45%.

Production Example 1-2 Production of Maleic Anhydride-Modified Polypropylene

In a glass flask equipped with a reflux condenser, a thermometer, and an agitator, 400 g of polypropylene obtained in Production Example 1-1 and 600 g of toluene were placed, the inside of the container was replaced with nitrogen gas, and the temperature was raised to 110° C. After raising the temperature, 100 g of maleic anhydride was added, and 30 g of t-butyl peroxyisopropyl monocarbonate (Perbutyl I (PBI), manufactured by NIPPON OILS CO., LTD.) was added, and the reaction was carried out by continuing stirring at the same temperature for 7 hours. After completion of the reaction, the system was cooled to about room temperature, acetone was added, and the precipitated polymer was filtered off. Precipitation and filtration were repeated with acetone, and the resulting polymer was washed with acetone. The polymer obtained after washing was dried under reduced pressure to obtain a white powdery maleic anhydride modified polymer. As a result of measuring the infrared absorption spectrum of the modified polymer, the content of maleic anhydride groups (graft ratio) was 3.7% by mass (0.37 mmol/g). The weight average molecular weight was 140,000.

Production Example 1-3 Production of Polypropylene Emulsion

In a glass flask equipped with a reflux condenser, thermometer and stirrer, 100 g of maleic anhydride-modified polypropylene (weight average molecular weight 140,000, maleic anhydride graft ratio 3.7%) obtained in Production Example 3 and 150 g of tetrahydrofuran were added and dissolved by heating to 65° C. Then, 5.8 g (2 chemical equivalent) of dimethylethanolamine was added, and while keeping the temperature at 65° C., 400 g of ion-exchanged water at 60° C. was added dropwise to change the phase. After that, 0.1 g of hydroquinone was added as an antioxidant, and tetrahydrofuran was distilled off by slowly raising the temperature to obtain a milky dispersion. The solid content of the dispersion was adjusted to 20% by mass by adding ion-exchanged water. The particle diameter of the aqueous dispersion was 0.1 µm or less.

Manufacturing Example 2

Production of Polyurethane Dispersion

Polycarbonate diol (Manufactured by Asahi Kasei Chemicals, Inc. T-4671) of 500 parts, dimethyl 5-sulfosodium-isophthalate of 134 parts and tetrabutyl titanate of 2 parts were charged in a pressure-resistant reaction vessel equipped with a stirring blade, a thermometer, a temperature control, a dropping device, a sampling port, a reflux device with a cooling pipe, and a nitrogen introduction pipe while passing nitrogen gas, and esterification reaction was carried out at a reaction temperature of 180° C., and finally a sulfonic acid group-containing polyester having a molecular weight of 2117, a hydroxyl value of 53 mgKOH/g and an acid value of 0.3 mgKOH/g was obtained.

280 parts of the sulfonic acid group-containing polyester, 200 parts of polybutylene adipate, 35 parts of 1,4-butanediol, 118 parts of hexamethylene diisocyanate and 400 parts of methyl ethyl ketone were charged in a reaction vessel equipped with a stirring blade, a thermometer, a temperature control, a dropping device, a sampling port, and a cooling pipe while passing nitrogen gas, and the urethanization reaction was carried out while holding the liquid temperature at 75° C. while stirring to obtain a urethane prepolymer having an NCO content of 1%. Subsequently, the temperature in the reaction vessel was lowered to 40° C., and 955 parts of ion-exchanged water was uniformly dropped while stirring sufficiently to perform phase inversion emulsification. Then, the internal temperature was lowered to room temperature, and an aqueous solution of adipic acid hydrazide in which 13 parts of adipic acid hydrazide and 110 parts of ion-exchanged water were mixed was added to perform amine elongation. Then, the solvent was removed by raising the liquid temperature to 60° C. in a slightly reduced pressure state, and at the end, ion-exchanged water was added so that the solid content of the polyurethane dispersion became 35% to obtain a sulfonic acid group-containing polyurethane dispersion. The acid value was 11 mgKOH/g.

Manufacturing Example 3

Preparation of Internal Crosslinked Acrylic Emulsion

An emulsion was prepared by slowly adding 45 parts by weight of styrene, 25 parts by weight of methyl methacrylate, 25 parts by weight of n-butyl acrylate and 5 parts by weight of ethylene glycol dimethacrylate to a solution obtained by adding 5.0 parts of Pelex-SSH (Alkyl diphenyl ether disulfonate sodium, manufactured by Kao Corporation) to 220 parts of deionized water.

Next, 100 parts of deionized water were put into a glass flask equipped with a cooler, a thermometer and an agitator and heated to 80° C. Thereafter, the emulsion and an initiator aqueous solution comprising 15.0 parts of deionized water and 0.03 part of potassium persulfate were dropped over 3 hours to obtain the desired crosslinked acrylic particle emulsion.

Manufacturing Example 4

Production of Pigment Dispersion Paste 11.75 parts of aqueous acrylic resin (Solid acid value: 52 mg KOH/g, weight average molecular weight: 32000, nonvolatile content: 30% by mass), 2.07 parts of Surfynol T 324 (pigment dispersant manufactured by Air Products), 1.61 parts of Surfynol 440 (antifoaming agent manufactured by Air Products), 38.5 parts of deionized water, 2.54 parts of carbon black ECP 600JD (Lion Corporation's conductive carbon), 37.64 parts of Ti-Pure-R 960 (DuPont's titanium oxide pigment), and 5.89 parts of Nipsil® 50B (silica manufactured by Nihon Silica), were sequentially added to a suitable container with an agitator under agitation, and after agitation for 1 hour, the mixture was dispersed with a 1.4 liter dynomill for laboratory use until the dispersion state measured by a grind gauge was 20 μm or less, thereby obtaining a pigment dispersion paste.

The pigment dispersion paste had a nonvolatile content of 52% by mass and a viscosity of 60 KU (20° C.).

Manufacturing Example 5

Production of Hydroxyl Group-Containing Resin 140 parts of butyl acetate was charged as a solvent into a reactor equipped with a stirring blade, a thermometer, a dropping device, a temperature control device, a nitrogen gas inlet, and a cooling pipe, and the temperature was raised to 125° C. under stirring while introducing nitrogen gas. Next, a mixture of 155.7 parts of 2-hydroxyethyl methacrylate, 45 parts of styrene, 112.9 parts of t-butyl methacrylate, 133.2 parts of n-butyl acrylate and 3.5 parts of methacrylic acid as a monomer and a solution obtained by dissolving 45 parts of Kayaester O (t-butylperoxy-2 ethylhexanoate, KAYAKU AKZO CO., LTD.) in 90 parts of butyl acetate as a polymerization initiator were added dropwise to the reactor over 3 hours.

After completion of the dropping, the mixture was allowed to mature for 1 hour, and 0.9 part of the polymerization initiator Kayaester O (t-butylperoxy-2 ethylhexanoate) was dissolved in 10 parts of butyl acetate and dropped into the reactor over 1 hour. The reaction was then allowed to mature for 2 hours while maintaining the temperature at 125° C., followed by cooling to complete the reaction.

The obtained acrylic resin had a weight average molecular weight of 7000 and a nonvolatile content of 65%.

Manufacturing Example 6

Preparation of Resin Particles 213 parts of bishydroxyethyl taurine, 208 parts of neopentyl glycol, 296 parts of phthalic anhydride, 376 parts of azelaic acid, and 30 parts of xylene were charged and heated in a reaction vessel equipped with a stirring and heating device, a thermometer, a nitrogen introducing pipe, a cooling pipe, and a decanter. The water formed by the reaction was removed by azeotroping with xylene. The temperature of the reaction liquid was adjusted to 210° C. over about 3 hours from the start of reflux, and stirring and dehydration were continued until the acid value corresponding to the carboxylic acid became 135 mgKOH/g (solid content).

After cooling the liquid temperature to 140° C., 500 parts of Cardura E10 (Product name; Shell's Versatile Acid Glycidyl Ester) was added dropwise in 30 minutes, and thereafter stirring was continued for about 2 hours to complete the reaction. An amphoteric ion group-containing polyester resin having an acid value of 55 mgKOH/g per solid content, a hydroxyl value of 91 mgKOH/g and a number average molecular weight of 1250 was obtained.

A monomer suspension was prepared by vigorously stirring 10 parts of the amphoteric ion-containing polyester resin, 140 parts of deionized water, 1 part of dimethylethanolamine, 50 parts of styrene and 50 parts of ethylene glycol dimethacrylate in a stainless steel beaker. An initiator aqueous solution was prepared by mixing 0.5 part of azobiscyanovaleric acid, 40 parts of deionized water and 0.32 part of dimethyl ethanolamine.

5 parts of the amphoteric ion group-containing polyester resin, 280 parts of deionized water and 0.5 part of dimethylethanolamine were charged into a reaction vessel equipped with a stirring and heating device, a thermometer, a nitrogen introducing pipe and a cooling pipe, and the temperature was raised to 80° C.

Here, 251 parts of the monomer suspension and 40.82 parts of the initiator aqueous solution were simultaneously added dropwise over 60 minutes, and further the reaction was continued for 60 minutes, and then the reaction was terminated.

A crosslinkable resin particle emulsion having a particle diameter of 55 nm measured by a dynamic light scattering method was obtained. Xylene was added to the crosslinkable resin particle emulsion, water was removed by azeotropic distillation under reduced pressure, and the medium was replaced with xylene to obtain a xylene solution of crosslinkable resin particles having a solid content of 20% by weight.

Synthesis Example 1

Synthesis of Crosslinked Resin 300 g of butyl acetate was charged into a glass separable flask equipped with a stirring blade, a temperature controller, a reflux pipe, a nitrogen inlet, and a dropping funnel, and the temperature was kept at 100° C. A mixture comprising 15.2 g of isobornyl methacrylate, 249.4 g of methyl methacrylate, 115.4 g of n-butyl methacrylate, 80.0 g of butyl acetate, 20.0 g of trimethylolpropane trimethacrylate, and 16.0 g of azobisisobutyronitrile was continuously added over 3 hours. Thereafter, the reaction was continued for 1 hour, a mixed solution of 20.0 g of butyl acetate and 2.0 g of azobisisobutyronitrile was added over 30 minutes, and cooling was started after 30 minutes had elapsed after the addition.

Synthesis Examples 2 to 7, Comparative Synthesis Examples 1 to 4

As in Synthesis Example 1, a crosslinked resin having the composition shown in Table 1 was synthesized.

TABLE 1

|  | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 |
|---|---|---|---|---|---|---|---|
| Isobornyl methacrylate | 15.2 | 15.2 | 33.6 | 15.2 | 14.4 | 12.8 | 12.8 |
| Methyl methacrylate | 249.4 | 319.7 | 346.4 | 319.7 | 302.9 | 2692 | 2692 |
| N-butyl methacrylate | 115.4 | 45.1 |  | 25.1 | 42.7 | 38.0 | 38.0 |
| Hydroxyethyl methacrylate |  |  |  | 20.0 |  |  |  |
| Ethylene glycol dimethacrylate |  |  |  | 20.0 |  |  |  |
| Trimethylolpropane trimethacrylate | 20.0 | 20.0 | 20.0 |  | 40.0 | 80.0 |  |
| Ditrimethylolpropane tetramethacrylate |  |  |  |  |  |  | 80.0 |
| Glass transition point(° C.) | 74 | 92 | 104 | 95 | 94 | 95 | 95 |
| Weight average molecular weight | 16,900 | 17,600 | 17,200 | 14,500 | 64,700 | 147,700 | 210,400 |

|  | Comparative synthesis Ex. 1 | Comparative synthesis Ex. 2 | Comparative synthesis Ex. 3 | Comparative synthesis Ex. 4 |
|---|---|---|---|---|
| Isobornyl methacrylate | 15.8 |  | 162.0 | 10.4 |
| Methyl methacrylate | 333.2 | 166.5 | 198.0 | 218.8 |
| N-butyl methacrylate | 47.0 | 193.5 |  | 30.8 |
| Hydroxyethyl methacrylate |  |  |  |  |
| Ethylene glycol dimethacrylate |  |  |  |  |
| Trimethylolpropane trimethacrylate | 4.0 | 40.0 | 40.0 | 140.0 |
| Ditrimethylolpropane tetramethacrylate |  |  |  |  |
| Glass transition point(° C.) | 91 | 54.0 | 131 | Gelation |
| Weight average molecular weight | 9,500 | 66700 | 54,200 |  |

Preparation of Coating Composition

Preparation of the Primers

Aqueous primers P1 to P3 of the formulations shown in Table 2 below were prepared.

TABLE 2

|  | P1 Blending amount | P2 Blending amount | P3 Blending amount |
|---|---|---|---|
| Polypropylene emulsion of manufacturing example 1 | 13.51 | 13.51 | 13.51 |
| Aqueous polyurethane dispersion of manufacturing example 2 | 8.21 | 16.41 | 19.01 |
| Aqueous epoxy resin Epikote 6006-W68 manufactured by Japan Chemtech | 10.80 | 2.60 | 0.00 |
| Acrylic emulsion of manufacturing example 3 | 0.89 | 0.89 | 0.89 |
| Pigment dispersion paste of manufacturing example 4 | 38.04 | 38.04 | 38.04 |
| Deionized water | 25.65 | 25.65 | 25.65 |
| Antifoaming agent Dynol604 manufactured by Air Products | 1.48 | 1.48 | 1.48 |
| Water soluble acrylic resin Disperbyk190 manufactured by BYK-Chemie | 0.34 | 0.34 | 0.34 |
| Alkaline swelling thickener ASE-60 manufactured by Rohm and Haas Company | 1.03 | 1.03 | 1.03 |
| Dimethyl ethanolamine | 0.05 | 0.05 | 0.05 |
| Tensile elongation | 2 | 20 | 40 |

(Base Coating Composition)

WB-3060 manufactured by NIPPON BEE CHEMICAL CO., LTD. was used as the water-based base paint, R-301 manufactured by NIPPON BEE CHEMICAL CO., LTD. as the solvent-based lacquer, and R-784 manufactured by NIPPON BEE CHEMICAL CO., LTD. as the solvent-based two component base coating composition.
(Clear Coating Composition)

A main agent and a curing agent were prepared as shown in Table 3 below. The mixing ratio of the main agent and the curing agent is 100/18.

TABLE 3

| | Blending amount |
|---|---|
| Main agent | |
| Hydroxyl group-containing resin of Manufacturing Example 1 | 56.63 |
| Crosslinked resin of Synthesis Ex. or Comparrative Synthesis Ex. | 35.71 |
| Surface modifier EFKA 3236 manufactured by BASF | 0.19 |
| Surface modifier BYK-310 manufactured by BYK-Chemie | 0.48 |
| 1.0% butyl acetate solution of dibutyl tin laurate | 0.68 |
| Ultraviolet absorberTinuvin 384-2 manufactured by Chiba Japan | 1.05 |
| Light stabilizerTinuvin 292 manufactured by Chiba Japan | 0.51 |
| Resin particles of manufacturing Example 6 | 4.74 |
| Curing agent | |
| Sumidur N3300 | 16.20 |
| Butyl acetate | 1.80 |

Examples 1 to 7 and Comparative Examples 1 to 5

Preparation of Coating Film

The coating films were prepared by the following procedure using the coating compositions shown in Table 4.
(i) Polypropylene material was washed with neutral detergent (degreasing and cleaning) and air blown to dry.
(ii) The aqueous primer was coated so as to have a dry film thickness of 10 μm and dried at 80° C. for 5 minutes.
(iii) In the case of WB-3060, the base coating composition was coated so as to have a dry film thickness of 15 μm, and after drying at 80° C. for 5 minutes, the clear coating composition was coated so as to have a dry film thickness of 30 μm. In the case of R-301, the base coating composition was coated so as to have a dry film thickness of 15 μm, and then the clear coating composition was coated so as to have a dry film thickness of 30 μm.

In the case of R-784, the base coating composition was coated so as to have a dry film thickness of 15 μm, and then the clear coating composition was coated so as to have a dry film thickness of 30 μm.

(iv) As a finishing, after applying the clear coating composition, the coating film was dried at 80° C. for 20 minutes to complete the preparation of the multilayer coating film.

The obtained coating film was evaluated based on the following criteria. The results are shown in Table 4.
(Tensile Elongation)
(i) A coating film was formed by coating a coating plate on which a film can be peeled so as to have a dry film thickness of 30 μm, and drying at 80° C. for 25 minutes.
(ii) A test piece was prepared in a size of 10 mm in length by 50 mm in width, a masking tape was stuck to both ends, and the remaining half of the masking tape was folded back.
(iii) The test piece was measured by Shimazu Autograph (AG-IS) under an environment of −20° C. and a tensile speed of 5 mm/min.
(iv) 5 samples were measured and the average value was calculated.
(Dupont Impact Strength)

Based on JIS K 5600-5-3, the evaluation was made on a cylinder with a shooting die radius of 6.35±0.03, a cradle diameter of 4.8 cm, and a plate thickness of 2 mm. A 500 g drop weight was used to measure the limit value at which the material could not be destroyed, and the evaluation was conducted using the following criteria.
◯: 4.9 J or more
x: <4.9 J
(Gasohol Resistance) [20° C.]

A piece of a polyolefin substrate (3 cm×3 cm) after coating was immersed in gasohol obtained by adding 10 vol. % of ethanol to regular gasoline, and then the piece having no stain was denoted by ◯ in 30 minutes and the others were denoted by x.
(Moisture Resistance)

The polyolefin substrate after coating was left in an atmosphere of 50° C. and 98% humidity for 10 days, and then its appearance was evaluated. The evaluation criteria of the appearance evaluation in the above moisture resistance test are as follows.
◯: In the case where there is no abnormality compared to the initial stage (Before moisture resistance test).
Δ: In the case where the coating film shows slight swelling or delustering compared to the initial stage (Before moisture resistance test).
x: In the case where there is swelling or delustering on the coating film compared to the initial stage (Before moisture resistance test)
(Flexibility Resistance)

In accordance with JIS K 5600-5-1, a 90° bending test was conducted at room temperature (Radius of curvature 10 mm).
◯: No abnormality
x: Crack occurs

TABLE 4

| | Ex. 1 | Ex. 2 | Ex. 3 | Ex. 4 | Ex. 5 | Ex. 6 | Ex. 7 |
|---|---|---|---|---|---|---|---|
| Clear (crosslinked resin used) | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 |
| Base | B1 | B1 | B1 | B2 | B3 | B1 | B1 |
| Primer | P2 | P2 | P2 | P2 | P2 | P2 | P2 |
| Dupont impact strength | ◯ | ◯ | ◯ | ◯ | ◯ | ◯ | ◯ |
| Gasohol resistance | ◯ | ◯ | ◯ | ◯ | ◯ | ◯ | ◯ |
| Moisture resistance | ◯ | ◯ | ◯ | ◯ | ◯ | ◯ | ◯ |
| Flexibility resistance | ◯ | ◯ | ◯ | ◯ | ◯ | ◯ | ◯ |

TABLE 4-continued

| Clear (crosslinked resin used) | Comparative Ex. 1 Comparative Synthesis Ex. 1 | Comparative Ex. 2 Comparative Synthesis Ex. 2 | Comparative Ex. 3 Comparative Synthesis Ex. 3 | Comparative Ex. 4 Synthesis Ex. 1 | Comparative Ex. 5 Synthesis Ex. 2 |
|---|---|---|---|---|---|
| Base | B1 | B1 | B1 | B1 | B1 |
| Primer | P2 | P2 | P2 | P1 | P3 |
| Dupont impact strength | X | X | ○ | X | ○ |
| Gasohol resistance | ○ | ○ | ○ | ○ | X |
| Moisture resistance | ○ | ○ | ○ | ○ | X |
| Flexibility resistance | ○ | ○ | X | ○ | ○ |

From the results of Table 4, it is clear that the automobile parts of the present disclosure have excellent effects in moisture resistance, flexibility resistance, and low temperature impact resistance.

INDUSTRIAL APPLICABILITY

The automobile part of the present disclosure can be suitably used as an automobile part such as a bumper.

The invention claimed is:

1. An automobile part obtained by forming a coating film layer on a plastic material comprising a polypropylene resin composition modified with an elastomer component having a thickness of 1.5 to 2.5 mm,
wherein said coating film layer is a multilayer coating film obtained by coating and baking the following coating compositions in this order;
(a) an aqueous conductive primer coating composition having a single film tensile elongation of 5 to 35% at −20° C., and comprising a conductive agent, a white pigment, and a pigment dispersion resin, wherein the pigment dispersion resin is selected from the group consisting of an acid-modified polypropylene, an acid-modified chlorinated polyolefin, an epoxy resin, a polyurethane resin, an aqueous alkyd resin, and a water-soluble acrylic resin,
(b) a base coating composition containing a coloring agent and,
(c) a clear coating composition containing at least a linear acrylic polyol (c-1) with a hydroxyl value of 80 to 220 mgKOH/g, a crosslinked acrylic resin (c-2) containing 2 to 30 parts by weight of polyfunctional monomer (c-2-1) with 2 to 4 radically polymerizable unsaturated groups per a molecule and 98 to 70 parts by weight of monofunctional monomer (c-2-2) with one polymerizable unsaturated group as a constituent unit, and having a glass transition point of 70 to 120° C., and a curing agent (c-3), and
wherein the coating film layer has a Dupont impact strength of 4.9 J or more at −30° C.

2. The automobile part according to claim 1, wherein the base coating composition is a solvent one-component composition, a solvent two-component composition, or an aqueous one-component composition.

3. The automobile part according to claim 1, wherein the crosslinked acrylic resin (c-2) has a weight average molecular weight of 15000 to 200000.

4. The automobile part according to claim 1, wherein a weight ratio of the linear acrylic polyol (c-1) to the crosslinked acrylic resin (c-2) is (c-1)/(c-2)=90/10 to 50/50.

* * * * *